United States Patent
Ispolatova et al.

(10) Patent No.: US 8,182,383 B2
(45) Date of Patent: May 22, 2012

(54) PLATE-LINK CHAIN

(75) Inventors: Olga Ispolatova, Bühl (DE); Marcus Junig, Bühl (DE); Michael Pichura, Bühl (DE); Anton Simonov, Bühl (DE)

(73) Assignee: Schaeffer Technologies AG & Co. KG, Herzogenaurach (DE)

( * ) Notice: Subject to any disclaimer, the term of this patent is extended or adjusted under 35 U.S.C. 154(b) by 582 days.

(21) Appl. No.: 12/231,333

(22) Filed: Aug. 30, 2008

(65) Prior Publication Data

US 2009/0082149 A1 Mar. 26, 2009

Related U.S. Application Data

(60) Provisional application No. 60/967,203, filed on Aug. 31, 2007.

(51) Int. Cl.
*F16H 13/04* (2006.01)
(52) U.S. Cl. ........................ 474/214; 474/229
(58) Field of Classification Search .................. 474/214, 474/215, 216, 217, 229, 245, 202, 206, 212, 474/213
See application file for complete search history.

(56) References Cited

U.S. PATENT DOCUMENTS

| 1,743,500 | A | | 1/1930 | Sturtevant | 474/215 |
| 5,464,374 | A | * | 11/1995 | Mott | 474/224 |
| 7,658,690 | B2 | | 2/2010 | Pichura et al. | 474/215 |
| 7,850,565 | B2 | * | 12/2010 | Junig et al. | 474/215 |
| 2006/0293139 | A1 | * | 12/2006 | Junig et al. | 474/215 |

FOREIGN PATENT DOCUMENTS

| WO | WO 2006/058529 A1 | 12/2006 |
| WO | WO 2006/133667 A2 | 12/2006 |

* cited by examiner

*Primary Examiner* — William E Dondero
*Assistant Examiner* — Juan Campos, Jr.
(74) *Attorney, Agent, or Firm* — Alfred J. Mangels

(57) ABSTRACT

A plate-link chain composed of a large number of plates that form plate sets, where adjacent plate sets are hingedly connected to each other by pairs of rocker members. The rocker members of a rocker member pair have rolling surfaces that bear against each other. Some plate sets, preferably every second one, have a cover plate on their outwardly-facing sides, and the two rocker members associated with the plate set provided with the cover plates are received in receiving openings of the cover plates, and are pressed into them. At least one of the openings has relief cuts on both ends of a contact surface contacted by the rolling surface of the received rocker member, with the cover plate opening having a third relief cut.

6 Claims, 3 Drawing Sheets

PLATE-LINK CHAIN

BACKGROUND OF THE INVENTION

1. Field of the Invention

The present invention relates to a plate-link chain made of a large number of plates that form plate sets, where adjacent plate sets are hingedly connected to each other by pairs of rocker members. The rocker members of a rocker member pair have rolling surfaces that bear against each other. Some plate sets, preferably every second one, have a cover plate on their outwardly-facing sides, and the two rocker members associated with the plate set provided with the cover plates are received in receiving openings of the cover plates. The present invention also relates to a cover plate for such a plate-link chain.

2. Description of the Related Art

One form of plate-link chain of this type is known from International Publication No. WO 2006/133667. That publication discloses a plate-link chain in which the rocker members are firmly connected to guide plates, wherein the guide plates receive the rocker members and have receiving openings that have two relief cuts. A plate-link chain, in particular a toothed plate-link chain, normally includes toothed plates as well as cover plates, and short and long rocker members. The varying number of toothed plates in the plate links results in a non-uniform distribution of stiffness in the chain strand. The stiffness of the cover plates serves to balance that difference in stiffness. The cover plate also has the function of lateral guidance for the plate-link chain. The long rocker members are pressed into corresponding openings in the cover plates. The compression connection must absorb the forces that arise because of the lateral guidance function. In the opening of the cover plate for receiving the rocker members there are two regions with especially small radii, at which critical stresses occur. From the disclosure in WO 2006/133667 it is known to use relief cuts at those two places in order to reduce the critical stresses.

The relief cuts in accordance with the existing art reduce the peak stresses that occur. In certain cases the peak stresses that occur can nevertheless be higher than desired. An object of the present invention is therefore to further reduce the stresses that occur in the cover plate when it is under load.

SUMMARY OF THE INVENTION

The object is achieved by a plate-link chain made of a large number of plates that form plate sets, where adjacent plate sets are hingedly connected to each other by pairs of rocker members. The rocker members of a rocker member pair have rolling surfaces that bear against each other. Some plate sets, preferably every second one, have a cover plate on their outwardly-facing sides, and the two rocker members associated with the plate set provided with the cover plates are received in receiving openings of the cover plates, and are pressed into them. At least one of the openings has relief cuts on both ends of a contact surface contacted by the rolling surface of the received rocker member, with the cover plate opening having a third relief cut.

The term plate-link chain is also used here in particular in the context of a toothed plate-link chain. Because of the third relief cut, three separate, defined contact or pressing zones are produced. That makes it easier to insert the rocker member in the pressing process, and the pressing process runs in a more defined manner. Furthermore, the pressing process can take place with greater overlap, since the opening is more elastic. The stresses at the critical places are thereby reduced.

The rocker member preferably bears on three contact surfaces of the receiving opening, there being a relief cut situated between each pair of contact surfaces. The profile in the region of the third relief cut is preferably concave, i.e., curved toward the inside. The profile of the third relief cut is preferably either convex or concave, or a straight line, or a spline.

The object identified earlier is also achieved by a cover plate for a plate-link chain that is made of a large number of plates that form plate sets, where adjacent plate sets are hingedly connected to each other by pairs of rocker members. The rocker members of a rocker member pair have rolling surfaces that bear against each other. Some plate sets, preferably every second one, have a cover plate on their outwardly-facing sides, and the two rocker members associated with the plate set provided with the cover plates are received in receiving openings of the cover plates, and are pressed into them. At least one of the openings has relief cuts on both ends of a contact surface contacted by the rolling surface of the received rocker member, with the cover plate opening having a third relief cut. The opening preferably has three contact surfaces for surface contact mounting of a rocker member, there being a relief cut situated between each pair of contact surfaces. The profile of the third relief cut is preferably convex or concave, or a straight line, or a spline.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
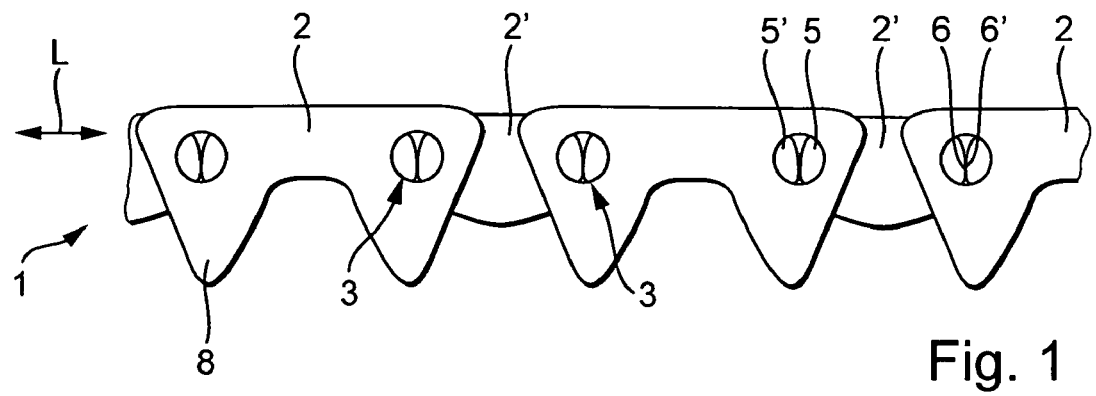
FIG. 1 is a longitudinal section through a portion of a plate-link chain.
Figure 2:
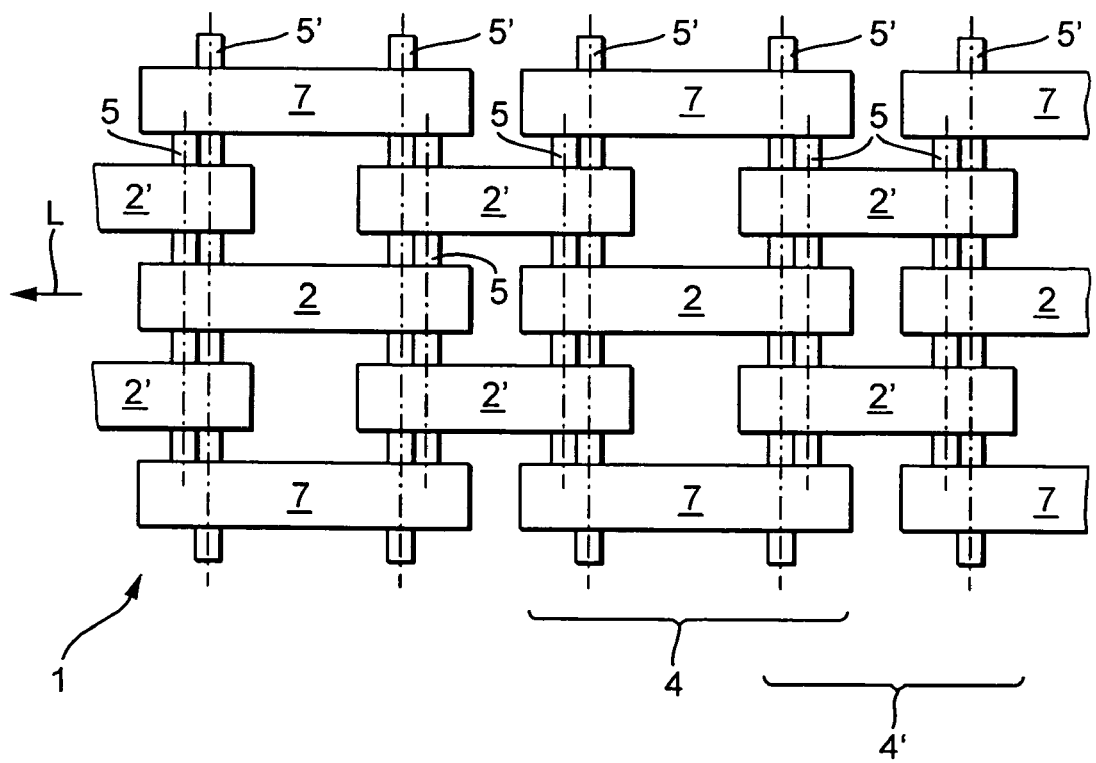
FIG. 2 is a top view of the portion of the plate-link chain shown in FIG. 1; in the known receiving opening.

FIG. 1 shows a side view and FIG. 2 shows a top view of a portion of a plate-link chain 1 having a two-plate grouping. The basic construction of plate-link chains and the terms used in the exemplary embodiments in accordance with the present invention will be explained on the basis of FIGS. 1 and 2. The exemplary embodiments will be described using the example of a plate-link chain having two-plate groupings, but they are equally applicable to a plate-link chain having three-plate groupings.

Plate-link chain 1 includes a large number of plates 2 and opposed plates 2'. Plates 2 and opposed plates 2' are alternatingly and partially overlappingly arranged, and they are connected as a link with link pins 3. Consequently, the end regions of a plate are connected by means of a link pin to one or two opposed plates, and correspondingly, the end regions of an opposed plate are connected to one or two plates with a link pin. The link pins 3 can be in one piece, but are preferably in two pieces, with a short rocker member 5 being associated with each of the plates 2 and rolling against a long rocker member 5' associated with the opposed plate 2'. In addition, rocker members 5, 5' each have a rolling surface 6 and 6', respectively, with which they can roll or slide against each other. The rolling surfaces 6, 6' can be identical or different.

The plates 2 and opposed plates 2' are stacked transversely to the chain running direction L (shown by a double-headed arrow). Thus, between two parallel link pins 3 that are situated perpendicular to the running direction L, an overlapping opposed plate 2' is arranged. And conversely, a plate 2 is arranged between and overlaps two opposed plates 2' that are located side-by-side transversely relative to the running direction L. The plate sets 4 of plates 2 arranged in that way form a chain link, and, correspondingly, the plate sets 4' of opposed plates 2' form a chain link. In the present exemplary embodiment the plates 2 and opposed plates 2' are identical parts; a differentiation between plates 2 and opposed plates 2' is recognizable only by the arrangement. Therefore only plates 2 will be referred to below, because they are identical to the opposed plates except for their arrangement in various plate sets to form chain links.

Both sides of the plate-link chain are provided with cover plates 7. The cover plates are shown here only on the chain links 4, so that only every second chain link has cover plates 7. The cover plates 7 are firmly joined in each case to the rocker members 5'. To that end, the rocker members are passed through cover plate receiving openings that are described further below and are press fitted; that is, they are pressed into the cover plate openings. Although the plates 2, which like the cover plates 7 belong to a chain link 4, are joined by the rocker members 5, which bear against them, the cover plates are firmly joined with the rocker members 5' of the adjacent chain links 4'. The rocker members 5 do not extend through the cover plates 7.

FIG. 2 shows a set of one plate 2 as well as one cover plate 7 on each of the two outer sides, and sets of two opposed plates 2'; however, sets with any other desired number of plates 2 and opposed plates 2' can also be provided.

The plates 2 are each provided with plate teeth 8, as can be seen in FIG. 1. With the plate teeth 8, plate link chain 1 can mesh with a toothed part, for example a gear. The spacing between plates 2 and opposed plates 2' is designed so that when the chain is extended a uniform spacing results overall between the plate teeth 8. The opposed plates 2', like the plates 2, are provided with plate teeth 8, so that all of the plates and opposed plates are provided with plate teeth 8. It is likewise also possible to provide either only plates 2 or opposed plates 2' with plate teeth 8, or to provide plates and opposed plates with only one plate tooth 8 each. The plate sets are enclosed on both sides by cover plates 7.

Figure 3:
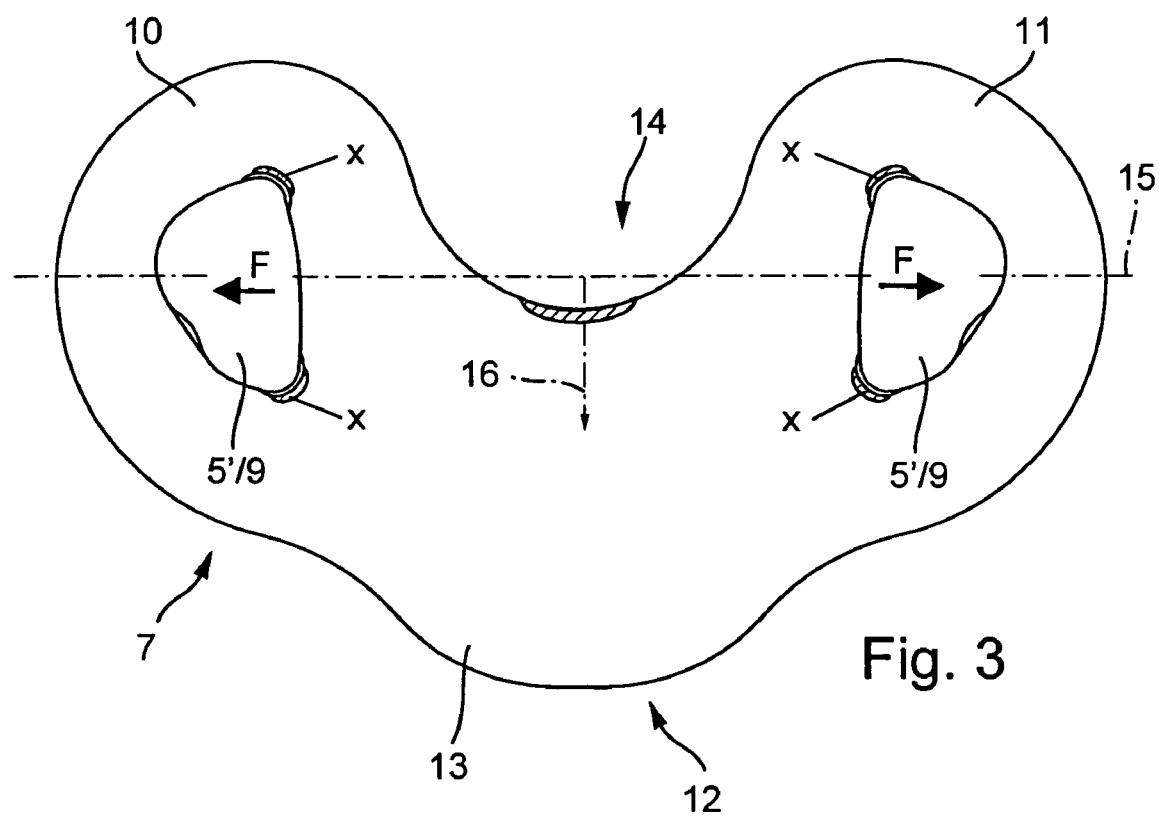
FIG. 3 is a side view of an exemplary embodiment of a cover plate in accordance with the present invention.

FIG. 3 shows a cover plate 7 in accordance with the present invention (also referred to as a guide plate) with two rocker members 5', each of which is situated in an opening 9. Two rocker members 5' are pressed into respective openings 9 of the cover plate 7. Cover plate 7 has a first receiving region 10 with an opening 9 and a second receiving region 11 also with an opening 9. The two receiving regions 10 and 11 are essentially designed approximately in the shape of disks, and are connected with each other by a connecting region 12. The connecting region 12 has a wing 13 on a lower edge and a recess 14 on the opposite, upper edge, so that the connecting region 12 is offset transversely to the chain running direction from a straight connecting line 15 that can be imagined running through the rocker members 5, 5'. The offset arrangement is indicated by an arrow 16 in FIG. 3. The offset arrangement reduces the tensile stiffness of cover plate 7 when under load in the direction of the force arrows F. The wing 13 also serves to provide lateral guidance of the link plate, for example on a chain wheel. Under loading with a force in the direction of the arrows F, comparatively high stresses arise in the regions of cover plate 7 designated as X.

Figure 4:
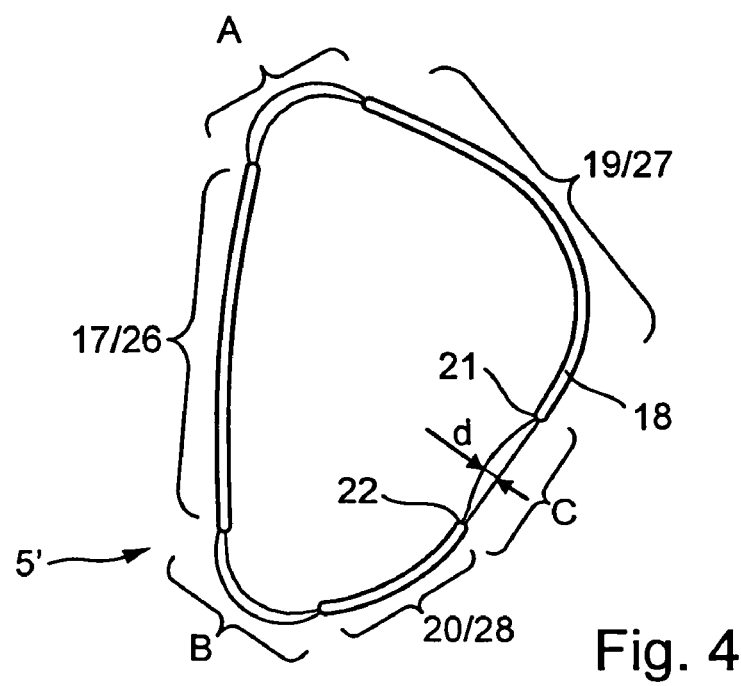
FIG. 4 is an end view of a rocker member and the contour of an associated receiving opening of the cover plate shown in FIG. 3.

FIG. 4 shows a cross section through a rocker member 5' as well as an opening 9 of cover plate 7 for receiving rocker member 5'. Rocker member 5' has a rolling surface 17, with which it rolls, or possibly slides, against the associated rocker member 5. The surface of the rocker member 5' outside of the rolling surface 17 is referred to here as the receiving profile 18, and serves to fix rocker member 5' in opening 9 of cover plate 7. To that end, the receiving profile includes a first receiving region 19 and a second receiving region 20, both of which are in contact with the inner surface of opening 9. Rolling surface 17 bears against a contact surface 26 of the inner surface of opening 9 in the region in which rocker member 5' is received by cover plate 7. Accordingly, first receiving region 19 bears against a contact surface 27 and second receiving region 20 against a contact surface 28. Thus rolling surface 17, as well as first receiving region 19 and second receiving region 20, are in surface-to-surface contact with portions of the inner surface of opening 9 of cover plate 7.

Opening 9 and the profile of rocker member 5' are each shaped so that a press fit is effected. Situated between contact surface 26 for rolling surface 17 and contact surface 27 for the first receiving region 19 of rocker member 5' is a relief cut A; situated between contact surface 26 for rolling surface 17 and contact surface 28 for the second receiving region 20 of rocker member 5' is a relief cut B. The relief cuts are thus situated in the region in which both the profile of rocker member 5' and the profile of opening 9 have comparatively high curvature. In addition, a third relief cut C is situated between first receiving region 19 and second receiving region 20. Third relief cut C thus lies essentially opposite from rolling surface 17 in reference to the profile of rocker member 5', while relief cuts A and B adjoin rolling surface 17. Relief cuts A, B, and C are consequently arranged in the manner of a triangle in relation to each other.

Figure 5:
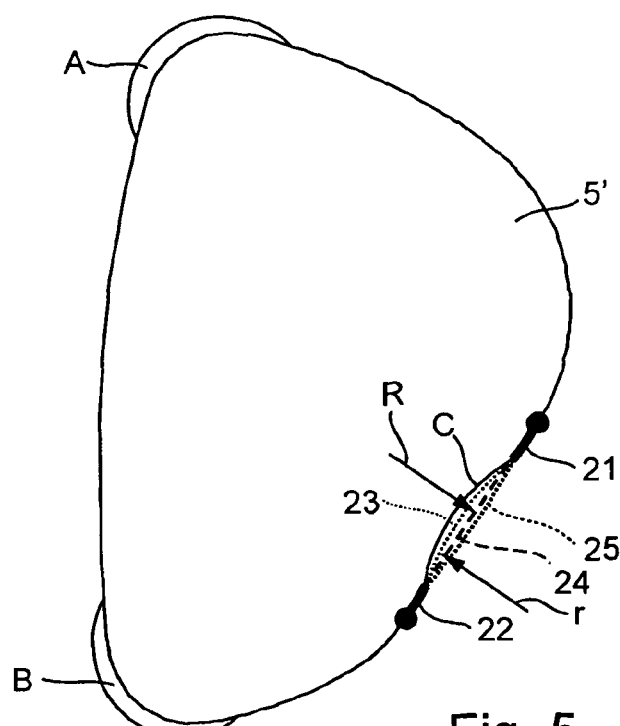
FIG. 5 shows various forms of a third relief cut in the receiving opening.

FIG. 5 shows several exemplary embodiments of relief cut C between contact surface 27 for first receiving region 19 and contact surface 28 for second receiving region 20. The profile of the rocker member has a concave curvature in this region. In contrast, both first receiving region 19 and second receiving region 20, or the corresponding contact surfaces 27, 28, are curved convexly, so that points 21 and 22 can be indicated on the outer contour of rocker member 5' or on opening 9, at which points the transition from convex to concave curvature takes place. Consequently, the outer contour of rocker member 5' is of concave design between the transition points 21 and 22, and a maximum distance arises with respect to the wall of opening 9, which is designated as d in FIG. 4. The contour of the opening 9 in cover plate 7 can be convex in this region, as shown by the example of a contour shown by a dotted line having the reference numeral 23, but it can also be a straight line, shown by a dashed line having the reference numeral 24 in FIG. 5, or it can have a concave contour, as shown by a dotted line having the reference numeral 25 in FIG. 5. The concave contour 25 has a radius R that can change over its extent; correspondingly, the convex radius 23 has a radius r that can change over the extent of its length. The contour can also be defined by a spline. Because of the different forms of the surface of opening 9 in the region of relief cut C, the maximum distance d between the surface of rocker member 5' and the surface of opening 9 can be varied. Likewise, the position of the relief cut C relative to relief cuts A and B can be varied; i.e., the concave reduction of area in rocker member 5' and the corresponding contour of opening 9 can be shifted along the receiving regions 19 or 20.

Figure 6A:
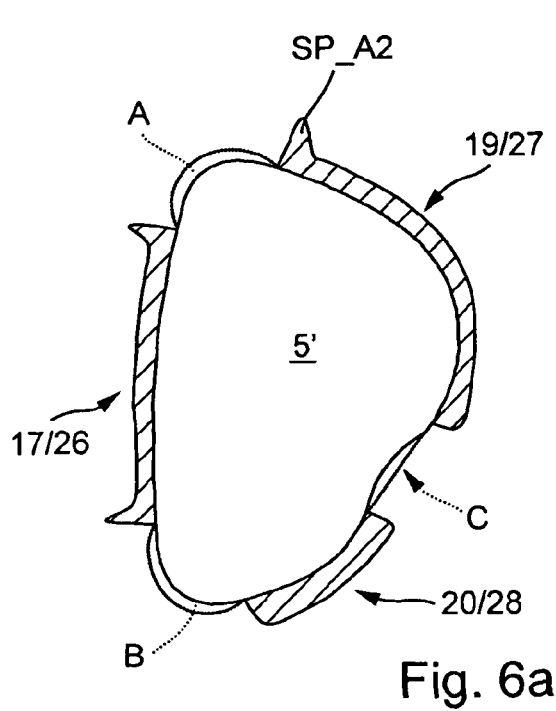
FIG. 6*a* shows stress patterns in a receiving opening with a relief cut in accordance with the present invention.
Figure 6B:
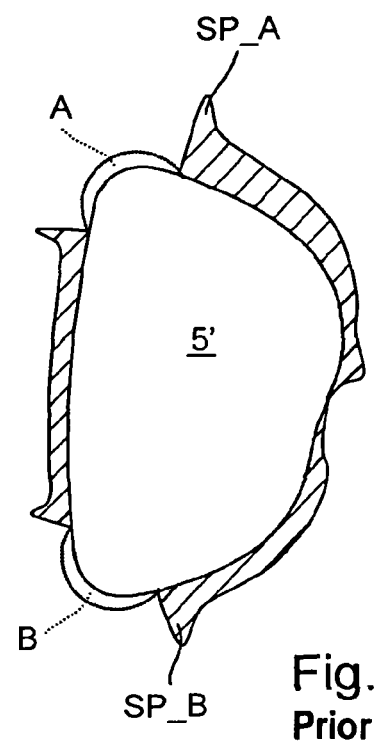
FIG. 6*b* shows stress patterns in the known receiving opening.

FIG. 6b shows a stress pattern of the normal stress on the surface of opening 9 for a contour of opening 9 in accordance with the known configuration, and FIG. 6a shows a stress pattern of the normal stress on the surface of opening 9 for a design in accordance with the present invention. Stress peaks occur on both sides of the relief cuts A and B. In the design in accordance with the known configuration a stress peak SP_A at the edge of relief cut A facing the first receiving region 19 and a stress peak designated SP_B at the edge of relief cut B facing receiving region 20 are especially high.

The stresses are plotted as distance in the normal direction from the contour of opening 9, with the length of the distance from contour 9 being a measure of the magnitude of the stress. If the stress equals zero, the graph of the stress converges with the contour of the opening 9. If the stress is greater than zero, that condition is shown by a graph at a corresponding distance from the contour. The region between the contour of opening 9 and the graph of the stress is shaded, which is a common way of showing stresses.

As can be seen from FIGS. 6a and 6b, the stress peaks SP_A and SP_B are reduced significantly by the design in accordance with the present invention. Moreover, the stresses are distributed approximately evenly over the contour of the receiving regions 19 and 20, except for a stress peak SP_A2 in FIG. 6a that corresponds in position to the stress peak SP_A in FIG. 6b in accordance with the known configuration. Hence, the design in accordance with the present invention not only brings about a significant reduction in the maximum stresses that occur; in particular directly adjacent to the relief cuts A and B, it also brings about a significantly more uniform distribution of the stresses.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate-link chain comprising: a plurality of link plates that form plate sets, wherein adjacent plate sets are hingedly connected to each other by pairs of rocker members, wherein the rocker members of a rocker member pair have rolling surfaces that bear against each other and oppositely-facing receiving regions, wherein a plurality of plate sets include a cover plate on respective outer sides of a plate set, wherein rocker members associated with a plate set having the cover plates are press-fitted into openings in the cover plates, wherein at least one of the cover plate openings includes a first contact surface that is in surface-to-surface contact with a rocker member rolling surface, and a pair of second contact surfaces that are each opposite to and face the first contact surface and are in surface-to-surface contact with a respective one of the rocker member receiving regions, a first stress relief cut at a first end of the first contact surface and a second stress relief cut at a second end of the first contact surface, wherein the at least one cover plate opening includes a third stress relief cut spaced from each of the first and second stress relief cuts, wherein rocker members are in contact with each of the three contact surfaces in the at least one cover plate opening and the third stress relief cut is provided between the pair of second contact surfaces, and wherein the rocker members have a profile that is concave in a rocker member region that is opposite to the third stress relief cut.

2. A plate-link chain in accordance with claim 1, wherein the third stress relief cut is convex.

3. A plate-link chain in accordance with claim 1, wherein the third stress relief cut is concave.

4. A plate-link chain in accordance with claim 1, wherein the third stress relief cut is a straight line.

5. A plate-link chain in accordance with claim 1, wherein the third stress relief cut is a spline curve.

6. A cover plate for a plate-link chain composed of a plurality of link plates that form plate sets, wherein adjacent plate sets are hingedly connected to each other by pairs of rocker members that have rolling surfaces that bear against each other and are received in a respective cover plate, said cover plate comprising: a plate having a pair of openings for receiving and retaining a respective rocker member, wherein at least one of the plate openings includes a first contact surface that is in surface-to-surface contact with a rocker member rolling surface, and a pair of second contact surfaces that are each opposite to and face the first contact surface and are in surface-to-surface contact with a respective one of the rocker member receiving regions, a first stress relief cut at a first end of the first contact surface and a second stress relief cut at a second end of the first contact surface, wherein the at least one cover plate opening includes a third stress relief cut spaced from each of the first and second stress relief cuts, wherein rocker members are in contact with each of the three contact surfaces in the at least one plate opening and the third stress relief cut is provided between the pair of second contact surfaces, and wherein the third stress relief cut is at least one of a convex curve, a concave curve, a straight line, and a spline curve.

\* \* \* \* \*